United States Patent
Tadano et al.

(10) Patent No.: US 9,541,025 B2
(45) Date of Patent: Jan. 10, 2017

(54) SEALING STRUCTURE

(71) Applicants: NOK CORPORATION, Tokyo (JP); TOYOTA JIDOSHA KABUSHIKI KAISHA, Toyota-shi, Aichi (JP)

(72) Inventors: Hikaru Tadano, Kitaibaraki (JP); Keijin Fuma, Anjo (JP); Hiromichi Yasuda, Toyota (JP)

(73) Assignee: NOK Corporation (JP)

(*) Notice: Subject to any disclaimer, the term of this patent is extended or adjusted under 35 U.S.C. 154(b) by 0 days.

(21) Appl. No.: 14/409,041

(22) PCT Filed: Jul. 16, 2013

(86) PCT No.: PCT/JP2013/069236
§ 371 (c)(1),
(2) Date: Dec. 18, 2014

(87) PCT Pub. No.: WO2014/013960
PCT Pub. Date: Jan. 23, 2014

(65) Prior Publication Data
US 2015/0137460 A1 May 21, 2015

(30) Foreign Application Priority Data

Jul. 17, 2012 (JP) .................. 2012-158283

(51) Int. Cl.
*F02M 99/00* (2006.01)
*F02F 11/00* (2006.01)
(Continued)

(52) U.S. Cl.
CPC .............. *F02F 11/002* (2013.01); *F02F 1/242* (2013.01); *F02M 61/14* (2013.01); *F16J 15/062* (2013.01);
(Continued)

(58) Field of Classification Search
CPC ........ F16J 15/062; F16J 15/106; F02F 11/002; F02F 11/00; F02M 61/14; F02M 2200/858
See application file for complete search history.

(56) References Cited

U.S. PATENT DOCUMENTS 3,255,916 A * 6/1966 Rice .............................. 220/304
3,485,056 A * 12/1969 Helmus ........................ 405/189
(Continued)

FOREIGN PATENT DOCUMENTS

DE 19743103 A1 4/1999
EP 0877189 A2 11/1998
(Continued)

OTHER PUBLICATIONS

Extended European Search Report for Patent Application No. EP 13819575.5 dated Jul. 23, 2015 (3 pages).

*Primary Examiner* — Kristina Fulton
*Assistant Examiner* — Eugene G Byrd
(74) *Attorney, Agent, or Firm* — Harness, Dickey & Pierce, P.L.C.

(57) ABSTRACT

In a sealing structure, a seal ring stands between an outer peripheral member and an inner peripheral member installed thereto. A taper-like outer peripheral surface having smaller diameter toward an inserting direction of the inner peripheral member and an installation portion outer peripheral surface extending from the small diameter end portion are formed on an outer peripheral surface of the inner peripheral member. A stepped surface positioned closer to the inserting direction side and directed to an opposite direction to the inserting direction, and an installation portion inner peripheral surface extending from an outer diameter end of the stepped surface in the opposite direction are formed on an inner peripheral surface of the outer peripheral member. The seal ring is arranged in a compressed state between the (Continued)

taper-like outer peripheral surface and the installation portion outer peripheral surface, and the stepped surface and the installation portion inner peripheral surface.

9 Claims, 7 Drawing Sheets

(51) Int. Cl.
*F16J 15/06* (2006.01)
*F16J 15/10* (2006.01)
*F02M 61/14* (2006.01)
*F16L 21/035* (2006.01)
*F02F 1/24* (2006.01)

(52) U.S. Cl.
CPC ............ *F16J 15/106* (2013.01); *F16L 21/035* (2013.01); *F02M 2200/858* (2013.01)

(56) References Cited

U.S. PATENT DOCUMENTS

| | | | |
|---|---|---|---|
| 3,858,912 A | 1/1975 | Bower | |
| 4,327,690 A * | 5/1982 | Sauer et al. | 123/469 |
| 4,402,773 A * | 9/1983 | Morrill | 285/25 |
| 5,551,400 A * | 9/1996 | Rice et al. | 123/470 |
| 6,082,333 A | 7/2000 | Vattelana et al. | |
| 6,193,238 B1 * | 2/2001 | Sporre | F16L 21/035 277/609 |
| 6,263,863 B1 * | 7/2001 | Giovannini et al. | 123/470 |
| 6,553,969 B1 * | 4/2003 | Hans et al. | 123/470 |
| 6,938,901 B2 | 9/2005 | Tsuchiya et al. | |
| 7,640,917 B2 * | 1/2010 | Daniel et al. | 123/470 |
| 2003/0030232 A1 * | 2/2003 | Westra et al. | 277/628 |
| 2004/0020470 A1 * | 2/2004 | Norgauer | 123/470 |
| 2004/0080115 A1 * | 4/2004 | Tsuchiya et al. | 277/458 |
| 2004/0094129 A1 * | 5/2004 | Raimann | 123/470 |
| 2005/0087930 A1 * | 4/2005 | D'Amico et al. | 277/312 |
| 2005/0253343 A1 * | 11/2005 | Hampton | 277/628 |
| 2006/0232066 A1 * | 10/2006 | Kanagae et al. | 285/348 |
| 2008/0018059 A1 * | 1/2008 | Otuka | 277/650 |
| 2009/0026762 A1 * | 1/2009 | Kitagawa | 285/344 |

FOREIGN PATENT DOCUMENTS

| | | |
|---|---|---|
| JP | S59-135379 U | 9/1984 |
| JP | H07-017807 | 4/1992 |
| JP | H09-112696 A | 5/1997 |
| JP | 2002-081549 A | 3/2002 |
| JP | 3830896 B2 | 10/2006 |
| JP | 4342121 B2 | 10/2009 |

* cited by examiner

SEALING STRUCTURE

CROSS-REFERENCE TO RELATED APPLICATIONS

This application is a U.S. National Stage Application of International Application No. PCT/JP2013/069236 filed on Jul. 16, 2013, and published in Japanese as WO 2014/013960 A1 on Jan. 23, 2014. This application claims priority to Japanese Application No. 2012-158283 filed on Jul. 17, 2012. The entire disclosures of the above applications are incorporated herein by reference.

BACKGROUND OF THE INVENTION

1. Field of the Invention

The present invention relates to a sealing structure for sealing a gap between an outer peripheral member and an inner peripheral member which is installed to the outer peripheral member in an inserted state, and more particularly relates to a sealing structure preferably used for high-pressure gas sealing, for example, sealing a gap between an attaching hole which is provided in a cylinder head of an internal combustion engine, and a leading end portion of an injector, a combustion sensor or a cylinder internal pressure sensor which is installed to the attaching hole in an inserted state.

2. Description of the Conventional Art

An in-cylinder direction injection type internal combustion engine is structured such as to directly inject fuel into a cylinder by an injector, and the injector is attached in an inserted state to an injector attaching hole which is provided in a cylinder head. Accordingly, in the injector, combustion gas is prevented from leaking by a seal ring so as to inhibit the combustion gas leakage from a gap between an inner peripheral surface of the injector attaching hole and an outer peripheral surface of the injector.

FIG. 7 shows a sealing structure between an injector attaching hole and an injector according to a prior art. More specifically, in FIG. 7, reference numeral 100 denotes a cylinder head of an internal combustion engine, and reference numeral 110 denotes an injector. The injector 110 is attached in an inserted state to an injector attaching hole 101 which is provided in the cylinder head 100 and is communicated with a combustion chamber (E), and is a device which directly injects fuel into the combustion chamber (E). A gap between the injector attaching hole 101 and a leading end portion of the injector 110 is sealed by a seal ring 120.

For details, on an outer peripheral surface in the vicinity of the leading end of the injector 110, there are formed a taper-like outer peripheral surface 111 which is smaller in its diameter toward an inserting direction thereof (a combustion chamber (E) side), an installation portion outer peripheral surface 112 which extends in the inserting direction from its small diameter end portion (a lower end), and a leading end outer peripheral surface 114 which is larger in its diameter than the installation portion outer peripheral surface 112 via a stepped surface 113 rising up in a diametrical direction from an end portion in the inserting direction in the installation portion outer peripheral surface 112. Further, the seal ring 120 standing between the injector attaching hole 101 and the leading end portion of the injector 110 is made of a synthetic resin material, for example, poly tetra fluoro ethylene (PTFE) having a high heat resistance, and is formed approximately into a rectangular shape in its cross sectional shape which is cut by a plane passing through a center axis, an outer peripheral surface 120a of the seal ring is brought into close contact with an inner surface of the injector attaching hole 101, and an inner peripheral surface 120b of the seal ring is brought into close contact with the installation portion outer peripheral surface 112 of the injector 110.

Therefore, according to the sealing structure, the seal ring 120 approximately having the rectangular shape in its cross sectional shape runs on the taper-like outer peripheral surface 111 from the installation portion outer peripheral surface 112 of the injector 110 while being displaced to an atmospheric air side space (A) side by pressure P of combustion gas in the combustion chamber (E) side, and is compressed in a diametrical direction between the inner peripheral surface of the injector attaching hole 101 and the taper-like outer peripheral surface 111 as shown in FIG. 8, and close contact surface pressure is increased by reaction force of the compression, so that it is possible to effectively shut off the combustion gas (refer, for example, to Japanese Patent No. 4342121 and Japanese Patent No. 3830896).

SUMMARY OF THE INVENTION

Problem to be Solved by the Invention

However, according to the conventional sealing structure mentioned above, the seal ring 120 is exposed to a diameter expanding deformation in a process that the seal ring 120 climbs over the leading end outer peripheral surface 114 having the larger diameter than the installation portion outer peripheral surface 112, in a work for installing the seal ring 120 to the installation portion outer peripheral surface 112 of the injector 110. Further, in the case that the seal ring 120 is made of a synthetic resin material which is poor in elasticity, the seal ring is not restored to the original state only by its own elasticity. Therefore, it is necessary to set the seal ring 120 right to the original state or a close state thereto by using a correcting jig, as described in Japanese Patent No. 4342121, and there is pointed out a problem that a man hour is increased.

Further, the seal ring 120 is structured such as to generate the close contact surface pressure by being exposed to the pressure P of the combustion gas, and it is necessary to make the seal ring 120 have a collapsing margin in the initial state, for obtaining an excellent sealing performance even under a low pressure condition. In other words, it is necessary to install the seal ring 120 in a compressed state regardless of existence of the pressure P due to the combustion gas. However, in this case, it is necessary to enlarge the load for setting the seal ring 120 right by using the correcting jig at the installing time, and there is pointed out a problem that the man hour at the installing time is increased.

The present invention is made by taking the above points into consideration, and a technical object of the present invention is to provide a sealing structure which does not increase a man hour at the installing time of a seal ring and can obtain an excellent sealing performance.

Means for Solving the Problem

As a means for effectively solving the technical problem mentioned above, according to a first aspect of the present invention, there is provided a sealing structure comprising:
an outer peripheral member;
an inner peripheral member which is installed to the outer peripheral member in an inserting state;
a seal ring which stands between the outer peripheral member and the inner peripheral member;

a taper-like outer peripheral surface which is smaller in its diameter toward an inserting direction of the inner peripheral member;

an installation portion outer peripheral surface which extends from the small diameter end portion toward the inserting direction;

the taper-like outer peripheral surface and the installation portion outer peripheral surface being formed on an outer peripheral surface of the inner peripheral member;

a stepped surface which is positioned closer to the inserting direction side than the taper-like outer peripheral surface and is directed to an opposite direction to the inserting direction;

an installation portion inner peripheral surface which extends from an outer diameter end of the stepped surface in the opposite direction to the inserting direction; and the stepped surface and the installation portion inner peripheral surface being formed on an inner peripheral surface of the outer peripheral member, wherein the seal ring is arranged in a compressed state between the taper-like outer peripheral surface and the installation portion outer peripheral surface, and the stepped surface and the installation portion inner peripheral surface.

According to the structure of the first aspect, the outer peripheral portion in the inserting direction side in the seal ring comes into contact with the stepped surface which is formed in the inner peripheral surface of the outer peripheral member by inserting the inner peripheral member to the outer peripheral member, for example, in the state in which the seal ring is outward inserted to the installation portion outer peripheral surface in the inner peripheral member, at the installing time of the seal ring. As a result, the seal ring is inhibited from moving in the inserting direction. Therefore, the inner peripheral surface in the opposite direction side to the inserting direction in the seal ring relatively runs on the taper-like outer peripheral surface which is formed on the outer peripheral surface of the inner peripheral member according to the insertion of the inner peripheral member, whereby the outer peripheral surface is pressed to the inner peripheral surface of the outer peripheral member. The "opposite direction side to the inserting direction" here means an opposite side to the inserting direction of the inner peripheral member. As a result, the seal ring is installed in the close contact state between the taper-like outer peripheral surface and the installation portion outer peripheral surface of the inner peripheral member, and the stepped surface and the installation portion inner peripheral surface of the outer peripheral member, only by inserting the inner peripheral member to the outer peripheral member in the state in which the seal ring is outward inserted to the outer peripheral surface in the small diameter side of the taper-like outer peripheral surface in the inner peripheral member. Therefore, it is not necessary to carry out the correcting work by using the correcting jig after the installation.

Further, in the case that the fluid pressure in the inserting direction side becomes high in the installing state of the seal ring, the seal ring is pressed to the opposite direction side to the inserting direction so as to run on the taper-like outer peripheral surface and is compressed between the taper-like outer peripheral surface and the installation portion inner peripheral surface of the outer peripheral member due to the pressure. As a result, it is possible to achieve an excellent sealing performance under a high-pressure condition. Further, since the seal ring is arranged in the compressed state between the taper-like outer peripheral surface and the stepped surface in the initial state, it is possible to achieve an excellent sealing performance even under a low-pressure condition.

A sealing structure according to a second aspect of the present invention is the sealing structure described in the first aspect, wherein a second taper-like outer peripheral surface is formed on the outer peripheral surface of the inner peripheral member, and the second taper-like outer peripheral surface is positioned closer to the opposite direction side to the inserting direction than the taper-like outer peripheral surface and has an outer diameter which is equal to or more than the large diameter end portion of the taper-like outer peripheral surface and is larger toward the opposite direction to the inserting direction.

A sealing structure according to a third aspect of the present invention is the sealing structure described in the second aspect, wherein a second outer peripheral surface is formed on the outer peripheral surface of the inner peripheral member, and the second outer peripheral member is positioned between the taper-like outer peripheral surface and the second taper-like outer peripheral surface and is formed into a cylindrical surface shape.

A sealing structure according to a fourth aspect of the present invention is the sealing structure described in any one of the first to third aspects, wherein a taper surface is formed on the inner peripheral surface of the outer peripheral member, and the taper surface is positioned closer to the opposite direction side to the inserting direction than the installation portion inner peripheral surface and has an inner diameter which is equal to or more than the large diameter end portion of the stepped surface and is larger toward the opposite direction side to the inserting direction.

According to the second to fourth aspects, the seal ring is exposed to the compression step by step by the taper surface which is formed on the taper-like outer peripheral surface formed in the inner peripheral member or the inner peripheral surface of the outer peripheral member in the process of inserting the inner peripheral member to the outer peripheral member, for example, in the state in which the seal ring is outward inserted to the outer peripheral surface which is closer to the small diameter side than the taper-like outer peripheral surface in the inner peripheral member, at the installing time of the seal ring. As a result, it is possible to stably apply a high close contact surface pressure.

A sealing structure according to a fifth aspect of the present invention is the sealing structure described in any one of the first to third aspects, wherein the stepped surface formed on the inner peripheral surface of the outer peripheral member is formed into a taper shape which is smaller in its diameter toward the inserting direction.

According to the fifth aspect, the seal ring is exposed to the compression between the stepped surface which is formed into the taper shape, and the taper-like outer peripheral surface, and the end surface of the seal ring coming into contact with the stepped surface is displaced to the small diameter side of the stepped surface by the reaction force of the compression, so that the inner peripheral surface in the inserting direction side is brought into close contact with the installation portion outer peripheral surface of the inner peripheral member. As a result, it is possible to achieve a further excellent sealing performance.

Effect of the Invention

According to the sealing structure of the present invention, since it is not necessary to carry out the correcting work by using the correcting jig after the installation of the seal ring, the increase in the man hour at the installing time of the seal ring is not caused. Further, the excellent sealing performance can be achieved even under the high pressure and low pressure conditions by employing the sealing structure according to the present invention.

DETAILED DESCRIPTION OF PREFERRED EMBODIMENTS

Figure 1:
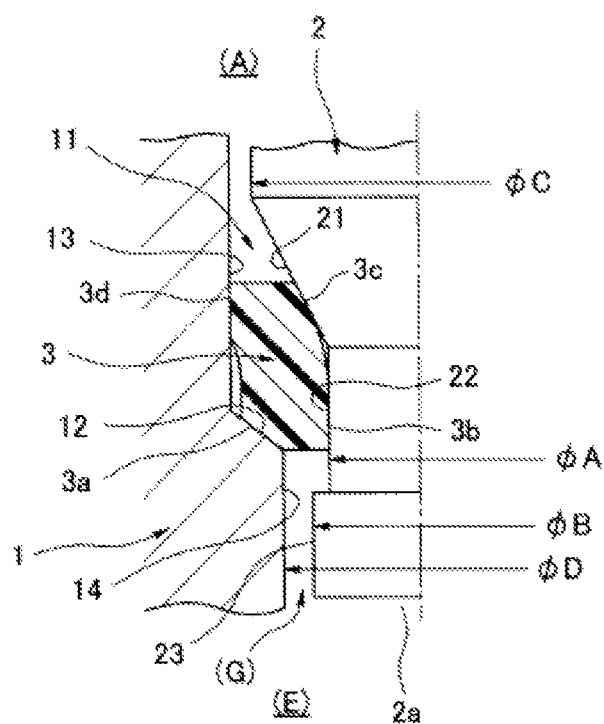
FIG. 1 is a half cross sectional view showing a first embodiment of a sealing structure according to the present invention.

A description will be in detail given below of a preferable embodiment obtained by applying a sealing structure according to the present invention to a leading end sealing structure for an injector, with reference to the accompanying drawings. FIG. 1 shows a first embodiment.

In FIG. 1, reference numeral 1 denotes a cylinder head in an internal combustion engine, reference numeral 2 denotes an injector which is attached in an inserting state to an injector attaching hole 11 which is provided in the cylinder head 1, and reference numeral 3 denotes a seal ring which stands between the injector attaching hole 11 (the cylinder head 1) and the injector 2 and shuts off high-temperature and high-pressure combustion gas from a combustion chamber (E) side. The cylinder head 1 corresponds to an outer peripheral member described in the first aspect of the present disclosure, and the injector 2 corresponds to an inner peripheral member described in the first aspect of the present disclosure.

The injector 2 is attached in a state in which the injector 2 is inserted to the injector attaching hole 11 of the cylinder head 1 while directing a nozzle 2a in a leading end at the combustion chamber (E) in an inner side of the cylinder head 1, and is structured such as to directly inject the fuel into the combustion chamber (E).

On an outer peripheral surface of the nozzle 2a in the injector 2, there are formed a taper-like outer peripheral surface 21 which is smaller in its diameter toward an inserting direction thereof (the combustion chamber (E) side), an installation portion outer peripheral surface 22 which extends from a small diameter end portion (a lower end) thereof to the inserting direction, and a leading end outer peripheral surface 23 which is appropriately larger in its diameter than the installation portion outer peripheral surface 22 via a stepped surface which rises up in a diametrical direction from an end portion in the inserting direction in the installation portion outer peripheral surface 22. In the case that $\phi A$ is an outer diameter of the installation portion outer peripheral surface 22, and $\phi B$ is an outer diameter of the leading end outer peripheral surface 23, it is preferable to establish a relationship $100\% < \phi B/\phi A < 110\%$.

On the other hand, on an inner peripheral surface of the injector attaching hole 11 in the cylinder head 1, there are formed a stepped surface 12 which is positioned closer to the inserting direction side than the taper-like outer peripheral surface 21 in the injector 2 in the installed state shown in FIG. 1 and is smaller in its diameter toward the inserting direction, an installation portion inner peripheral surface 13 which extends from a large diameter end portion to an opposite direction to the inserting direction (an atmospheric air side space (A) side), and a small diameter inner peripheral surface 14 which extends from the small diameter end portion of the stepped surface 12 in the inserting direction. An inner diameter $\phi D$ of the small diameter end portion (the small diameter inner peripheral surface 14) of the stepped surface 12 is smaller than an outer diameter $\phi C$ of the larger diameter end portion of the taper-like outer peripheral surface 21, and is larger than the outer diameter $\phi B$ of the leading end outer peripheral surface 23 in the injector 2.

Further, in the installed state shown in FIG. 1, the nozzle 2a (the leading end outer peripheral surface 23) in the leading end of the injector 2 reaches the inner peripheral position of the small diameter inner peripheral surface 14 in the injector attaching hole 11, and the taper-like outer peripheral surface 21 is positioned closer to the opposite direction to the inserting direction than the stepped surface 12 in the injector attaching hole 11. In other words, the taper-like outer peripheral surface 21 and the installation portion inner peripheral surface 13 face to each other in the diametrical direction, and the stepped surface 12 and the installation portion outer peripheral surface 22 face to each other in the diametrical direction.

Figure 2:
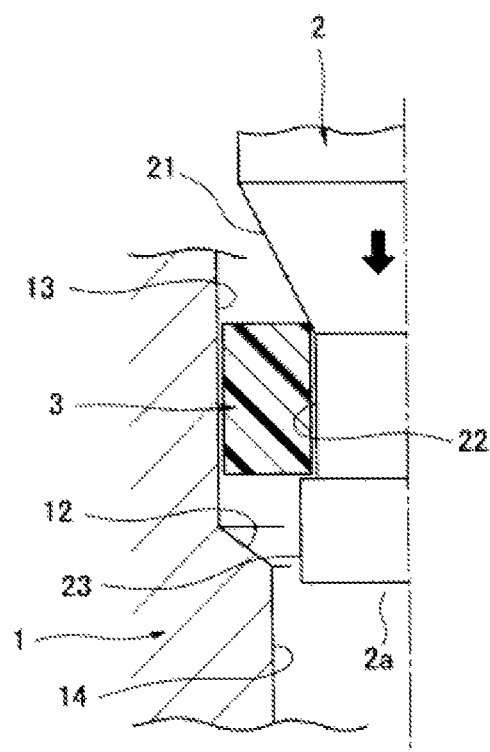
FIG. 2 is a half cross sectional view showing an installing process of a seal ring in the first embodiment of the sealing structure according to the present invention.

The seal ring 3 is made of a synthetic resin material such as PTFE, is formed approximately into a rectangular shape in its cross sectional shape which is obtained by cutting with a plane passing through a center axis as shown in FIG. 2, in a non-installed state, and is arranged in a compressed state between the taper-like outer peripheral surface 21 and the installation portion outer peripheral surface 22 in the injector 2, and the stepped surface 12 and the installation portion inner peripheral surface 13 in the injector attaching hole 11 of the cylinder head 1, in the installed state shown in FIG. 1.

More specifically, in the seal ring 3, an end surface outer diameter portion 3a in the inserting direction side is brought into close contact with the stepped surface 12 in the injector attaching hole 11 of the cylinder head 1 approximately in a compressed state, an inner peripheral surface 3b in the inserting direction side is brought into close contact with the installation portion outer peripheral surface 22 in the injector 2 with an appropriate surface pressure on the basis of the compression reaction force, an inner peripheral surface 3c in the opposite direction side to the inserting direction comes into close contact with the taper-like outer peripheral surface 21 in the injector 2 in a state in which the inner peripheral surface relatively runs on the taper-like outer peripheral surface, and an outer peripheral surface 3d in the opposite side to the inserting direction is pressed to the installation portion inner peripheral surface 13 in the injector attaching hole 11 of the cylinder head 1 on the basis of the running-on, and is brought into close contact therewith by an appropriate surface pressure.

According to the structure mentioned above, in the case that the pressure of the high-temperature and high-pressure combustion gas from the combustion chamber (E) side is applied to the seal ring 3 via an annular gap (G) between the nozzle 2a of the injector 2 and the inner diameter inner peripheral surface 14 in the injector attaching hole 11 of the cylinder head 1, the inner peripheral surface 3c in the opposite direction side to the inserting direction of the seal ring 3 is going to further run on the taper-like outer peripheral surface 21 in the injector 2 due to the gas pressure. Therefore, a compression rate of the portion in the opposite direction side to the inserting direction (the portion in the atmospheric air side space (A) side) of the seal ring 3 becomes greater, the close contact surface pressure with the taper-like outer peripheral surface 21 in the injector 2 and the installation portion inner peripheral surface 13 of the injector attaching hole 11 is increased by the reaction force, and it is possible to effectively shut off the leakage of the combustion gas to the atmospheric air side space (A) side.

Further, in the seal ring 3, the end surface outer diameter portion 3a in the inserting direction side is brought into close contact with the taper-like inner peripheral surface 12 approximately under the compressed state even in the initial state, the inner peripheral surface 3b in the inserting direction side is brought into close contact with the installation portion outer peripheral surface 22, and the inner peripheral surface 3c in the opposite side to the inserting direction comes into close contact with the taper-like outer peripheral surface 21 in the running-on state, and the outer peripheral surface 3d in the opposite direction side to the inserting direction is brought into close contact with the installation portion inner peripheral surface 13 by the running-on. As a result, it is possible to achieve the excellent sealing performance even in the case that the combustion chamber (E) is low in its pressure.

Further, when the seal ring 3 is installed like a state in FIG. 1, first of all, the seal ring 3 is previously outward inserted to the installation portion outer peripheral surface 22 from the leading end side of the nozzle 2a in the injector 2, as shown in FIG. 2. In this outward inserting work, the seal ring 3 necessarily climbs over the leading end outer peripheral surface 23 having the larger diameter than the installation portion outer peripheral surface 22. However, as long as the outer diameter $\phi A$ of the installation portion outer peripheral surface 22 and the outer diameter $\phi B$ of the leading end outer peripheral surface 23 have the relationship $100\%<\phi B/\phi A<110\%$, the seal ring 3 is only slightly expanded in the process that the seal ring 3 climbs over the leading end outer peripheral surface 23. As a result, it is possible to effectively prevent residual deformation of the seal ring 3.

Next, the injector 2 is inserted to the injector attaching hole 11 of the cylinder head 1, the injector 2 having the seal ring 3 outward inserted to the installation portion outer peripheral surface 22. Then, in the inserting process, the end surface outer diameter portion 3a in the inserting direction side of the seal ring 3 first of all comes into contact with the stepped surface 12 in the injector attaching hole 11, whereby the movement of the seal ring 3 in the inserting direction is inhibited. As a result, the inner peripheral surface 3c in the opposite direction side to the inserting direction of the seal ring 3 relatively runs on the taper-like outer peripheral surface 21 of the injector 2 according to the insertion of the injector 2. Therefore, the outer peripheral surface 3d in the opposite direction side to the inserting direction is pressed to the installation portion inner peripheral surface 13 in the injector attaching hole 11, and the seal ring 3 is further exposed to the compression between the stepped surface 12 and the taper-like outer peripheral surface 21, so that the end surface outer diameter portion 3a of the seal ring 3 is displaced to the small diameter side along the stepped surface 12 formed into the taper shape on the basis of the reaction force of the compression. Then, the inner peripheral surface 3b in the inserting direction side is brought into close contact with the installation portion outer peripheral surface 22 of the injector 2 and comes to the installed state shown in FIG. 1.

Therefore, the seal ring 3 is installed to the taper-like outer peripheral surface 21 and the installation portion outer peripheral surface 22 of the injector 2, and the stepped surface 12 and the installation portion inner peripheral surface 13 in the injector attaching hole 11 in the state in which the seal ring is brought into close contact therewith with the appropriate surface pressure, only by inserting the injector 2 to the injector attaching hole 11 of the cylinder head 1 after previously outward inserting the seal ring 3 to the installation portion outer peripheral surface 22 of the injector 2. As a result, it is not necessary to carry out the correcting work by the correcting jig after the installation.

Figure 3:
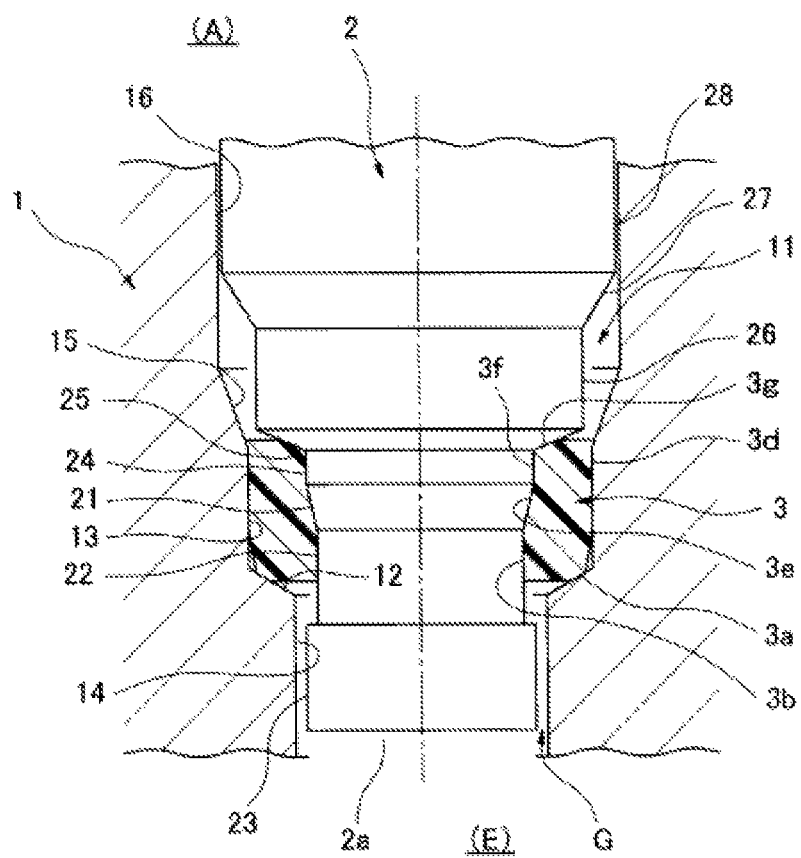
FIG. 3 is a cross sectional view showing a second embodiment of the sealing structure according to the present invention.

Next, FIG. 3 shows a second embodiment in which the sealing structure according to the present invention is applied to a leading end sealing structure for an injector.

The second embodiment is different from the first embodiment in a point that a second outer peripheral surface 24 and a second taper-like outer peripheral surface 25 are formed on an outer peripheral surface of the injector 2, the second outer peripheral surface 24 extending from a large diameter end portion of the taper-like outer peripheral surface 21 to the opposite direction to the inserting direction (the above; the atmospheric air side space (A) side) and being formed into a cylindrical shape, the second taper-like outer peripheral surface 25 being larger in its diameter from an end portion (an upper end) in the opposite direction to the inserting direction toward the opposite direction to the inserting direction, and a second taper-like inner peripheral surface 15 is formed on an inner peripheral surface of the injector attaching hole 11 in the cylinder head 1, the second taper-like inner peripheral surface 15 being larger in its diameter from the end portion in the opposite direction side to the inserting direction of the installation portion inner peripheral surface 13 existing closer to the opposite direction to the inserting direction than the stepped surface 12, further toward the opposite direction to the inserting direction. The second taper-like inner peripheral surface 15 corresponds to a taper surface described in the fourth aspect of the present disclosure.

Further, the outer peripheral surface of the injector 2 has a third outer peripheral surface 26 which extends from a large diameter end portion of the second taper-like outer peripheral surface 25 to the opposite direction to the inserting direction and is formed into a cylindrical surface shape, a third taper-like outer peripheral surface 27 which is larger in its diameter from an end portion in the opposite direction to the inserting direction toward the opposite direction to the inserting direction, and a fourth outer peripheral surface 28 which further extends from the large diameter end portion in the opposite direction to the inserting direction and is formed into a cylindrical surface shape, and the fourth outer peripheral surface 28 is inserted to a large diameter inner peripheral surface 16 which extends from a large diameter end portion of the second taper-like inner peripheral surface 15 in the injector attaching hole 11 in the opposite direction to the inserting direction via a slight gap.

Further, an outer diameter of the large diameter end portion (the third outer peripheral surface 26) of the second taper-like outer peripheral surface 25 in the injector 2 is larger than an inner diameter of the small diameter end portion (the small diameter inner peripheral surface 14) of the stepped surface 12 in the injector attaching hole 11 and is smaller than an inner diameter of the small diameter end portion (the installation portion inner peripheral surface 13) of the second taper-like inner peripheral surface 15, the second taper-like outer peripheral surface 25 is positioned in an inner peripheral side of the second taper-like inner peripheral surface 15, and the taper-like outer peripheral surface 21 in the injector 2 is positioned in an inner peripheral side of the installation portion inner peripheral surface 13 in the injector attaching hole 11.

Further, the taper-like outer peripheral surface 21 in the injector 2 is smaller in its angle of incline in relation to a cylinder surface which is concentric with the center axis of the nozzle 2a than the second taper-like outer peripheral surface 25, and the second taper-like inner peripheral surface 15 in the injector attaching hole 11 of the cylinder head 1 is smaller in its angle of incline in relation to a cylinder surface which is concentric with the center axis of the injector attaching hole 11 than the angle of incline of the stepped surface 12.

Figure 4:
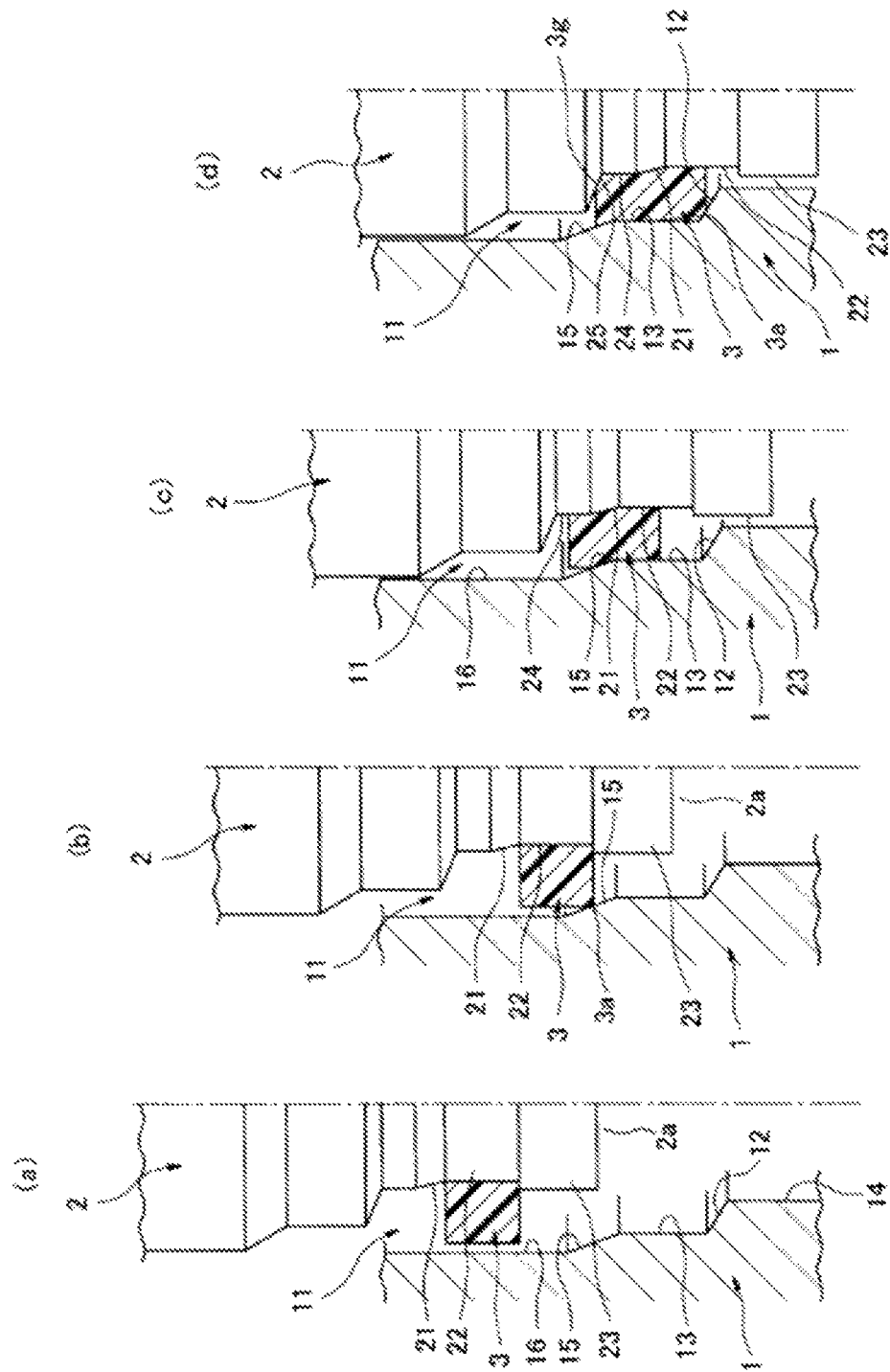
FIG. 4 is a half cross sectional view showing an installing process of a seal ring step by step, in the second embodiment of the sealing structure according to the present invention.

Further, the seal ring 3 is formed approximately into a rectangular shape in a cross sectional shape obtained by cutting with a plane passing through the center axis in the non-installed state, as shown in FIG. 4A. In the installed state shown in FIG. 3, an end surface outer diameter portion 3a in the inserting direction side is brought into close contact with the stepped surface 12 in the injector attaching hole 11 in an approximately compressed state, an inner peripheral surface 3b in the inserting direction side is brought into close contact with the installation portion outer peripheral surface 22 in the injector 2 and an inner peripheral surface 3e in an intermediate portion and an inner peripheral surface 3f in the opposite direction side to the inserting direction come into close contact with the taper-like outer peripheral surface 21 in the injector 2 in a running-on state, on the basis of the reaction force of the compression, and an end surface inner diameter portion 3g in the opposite direction side to the inserting direction comes into pressure contact with the second taper-like outer peripheral surface 25 in the injector 2. As a result, an outer peripheral surface 3d in the opposite direction side to the inserting direction is pressed to a part of the installation portion inner peripheral surface 13 and the second taper-like inner peripheral surface 15 in the injector attaching hole 11, and is brought into close contact therewith.

According to the second embodiment structured as mentioned above, in the case that the pressure of the high-temperature and high-pressure combustion gas from the combustion chamber (E) side is applied to the seal ring 3 via an annular gap (G) between the nozzle 2a of the injector 2 and the inner diameter inner peripheral surface 14 in the injector attaching hole 11 of the cylinder head 1, the seal ring 3 is going to be displaced in the opposite direction to the inserting direction due to the gas pressure, in the same manner as the first embodiment. Therefore, the close contact surface pressure is increased, and it is possible to effectively shut off the combustion gas.

Further, since the seal ring 3 is exposed to the compression step by step by the taper-like outer peripheral surface 21 and the second taper-like outer peripheral surface 25 in the injector 2 and the second taper-like inner peripheral surface 15 and the stepped surface 12 in the injector attaching hole 11 in the installing process as mentioned later, it is possible to stably apply the high close contact surface pressure. As a result, it is possible to achieve the excellent sealing performance even in the case that the combustion chamber (E) is low in its pressure.

Further, when the seal ring 3 is installed like a state in FIG. 3, first of all, the seal ring 3 is previously outward inserted to the installation portion outer peripheral surface 22 from the leading end side of the nozzle 2a in the injector 2. In this case, as long as the outer diameter φA of the installation portion outer peripheral surface 22 and the outer diameter φB of the leading end outer peripheral surface 23 have the relationship 100%<φB/φA<110%, the seal ring 3 is only slightly expanded in the process that the seal ring 3 climbs over the leading end outer peripheral surface 23, in the same manner as the first embodiment described previously. As a result, it is possible to effectively prevent the residual deformation of the seal ring 3.

Next, the injector 2 is inserted to the injector attaching hole 11 of the cylinder head 1, the injector 2 having the seal ring 3 outward inserted, as shown in FIG. 4A. Then, in the inserting process, the end surface outer diameter portion 3a in the inserting direction side of the seal ring 3 first of all comes into contact with the second taper-like inner peripheral surface 15 in the injector attaching hole 11, as shown in FIG. 4B. Since an angle of incline of the second taper-like inner peripheral surface 15 is low, the seal ring is going to be inserted to the installation portion inner peripheral surface 13 while being compressed in such a manner as to be stroked in the diametrical direction on the basis of the sliding motion with the second taper-like inner peripheral surface 15.

Further, as shown in FIG. 4C, the seal ring 3 is increased its contact area with the installation portion inner peripheral surface 13 in the inserting process, and a resistance of insertion becomes larger by being compressed. Therefore, the seal ring 3 runs on the second outer peripheral surface 24 via the taper-like outer peripheral surface 21 having the small angle of incline from the installation portion outer peripheral surface 22 in the injector 2, on the basis of the resistance of insertion. As a result, the seal ring is exposed to the compression so as to be stroked in the diametrical direction. Further, on the basis of the compression, there is achieved a state in which a certain degree of sealing performance can be achieved even in the case that the combustion chamber (E) is low its pressure.

Further, in the case that the end surface inner diameter portion 3g in the opposite direction side to the inserting direction of the seal ring 3 running on the second outer peripheral surface 24 comes into contact with the second taper-like outer peripheral surface 25 in the injector 2, as shown in FIG. 4D, the seal ring 3 moves further in the inserting direction by being pressed by the second taper-like outer peripheral surface 25. As a result, the end surface outer diameter portion 3a in the inserting direction side is pressed to the stepped surface 12, and comes to the installed state shown in FIG. 3.

Therefore, in the embodiment, the seal ring 3 is installed to the taper-like outer peripheral surface 21 and the installation portion outer peripheral surface 22 of the injector 2, and the stepped surface 12 and the installation portion inner peripheral surface 13 in the injector attaching hole 11 in the state in which the seal ring is brought into close contact therewith with the appropriate surface pressure, only by inserting the injector 2 to the injector attaching hole 11 of the cylinder head 1 after previously outward inserting the seal ring 3 to the installation portion outer peripheral surface 22 of the injector 2. As a result, it is not necessary to carry out the correcting work by the correcting jig after the installation.

Further, in the installing process mentioned above, the seal ring 3 is exposed to the compression from the outer peripheral side and the inner peripheral side by the second taper-like inner peripheral surface 15 and the taper-like outer peripheral surface 21, and is exposed to the compression between the second taper-like outer peripheral surface 25 and the stepped surface 12. As a result, since the compression rate is increased step by step, it is possible to stably apply the high close contact surface pressure.

Figure 5:
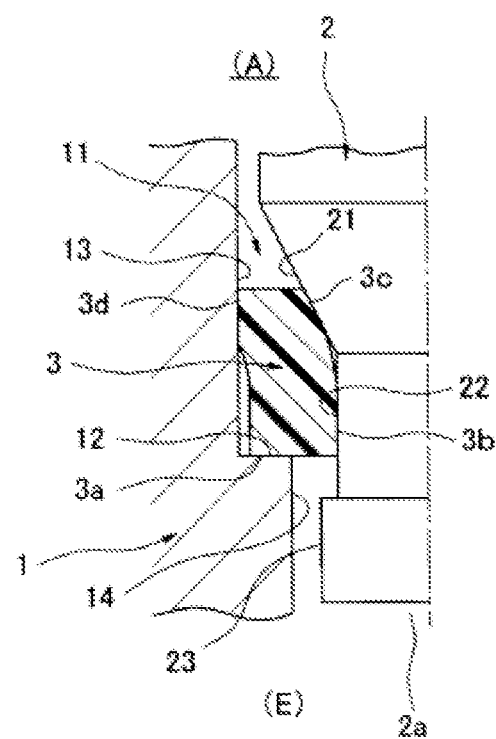
FIG. 5 is a half cross sectional view showing a modified example of a shape of the first embodiment of the sealing structure according to the present invention.
Figure 6:
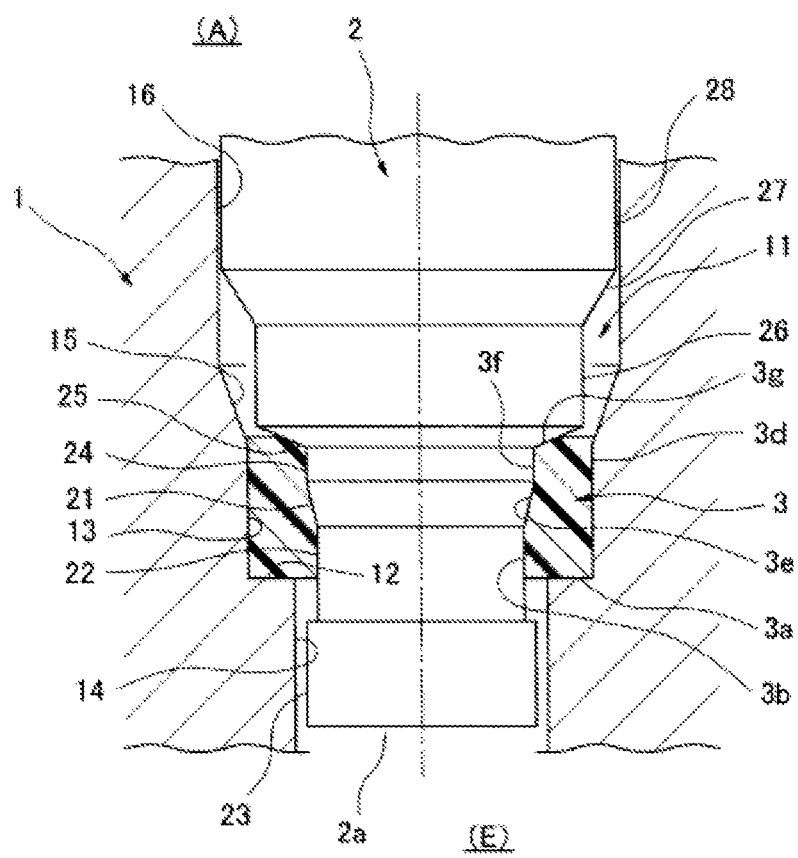
FIG. 6 is a half cross sectional view showing a modified example of a shape of the second embodiment of the sealing structure according to the present invention.
Figure 7:
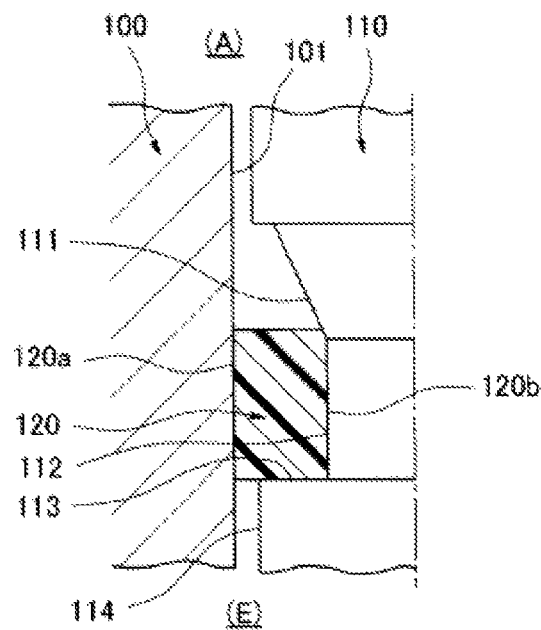
FIG. 7 is a half cross sectional view showing a sealing structure between an injector attaching hole and an injector according to a prior art.
Figure 8:
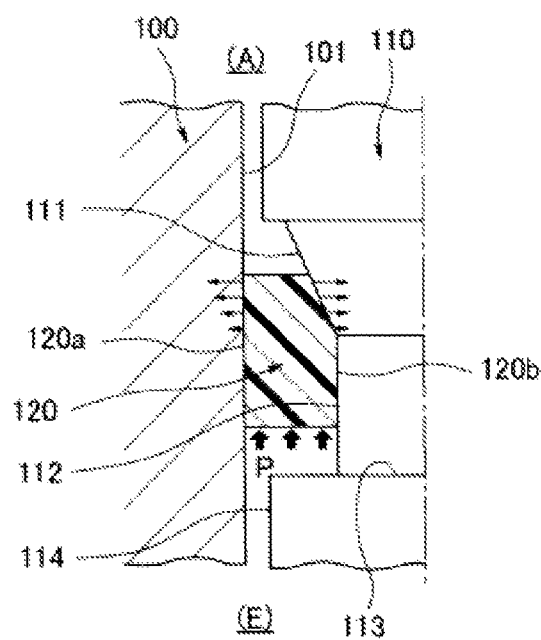
FIG. 8 is a half cross sectional view showing a state in which pressure of combustion gas is applied, in the sealing structure between the injector attaching hole and the injector according to the prior art.

The embodiment mentioned above is structured such that the stepped surface 12 is formed into the taper shape which is smaller in its diameter toward the inserting direction, however, the same effect as mentioned above can be achieved in a structure having no incline, that is, formed into a plane which is orthogonal to an axis, as exemplified by shape modified examples in FIGS. 5 and 6.

Further, in the embodiment mentioned above, the present invention is applied to the leading end sealing structure for the injector, however, the present invention is not limited to this, but may be applied, for example, to a sealing structure between a combustion pressure sensor and its attaching hole, and a sealing structure between a cylinder internal pressure sensor and its attaching hole.

What is claimed is:

1. A sealing structure comprising:
an outer peripheral member;
an inner peripheral member which is installed to the outer peripheral member in an inserting state;
a seal ring which stands between the outer peripheral member and the inner peripheral member;
a taper-like outer peripheral surface which is smaller in its diameter toward an inserting direction of the inner peripheral member;
an installation portion outer peripheral surface which extends from the small diameter end portion toward said inserting direction;
the taper-like outer peripheral surface and the installation portion outer peripheral surface being formed on an outer peripheral surface of said inner peripheral member;
a stepped surface which is positioned closer to said inserting direction side than said taper-like outer peripheral surface and is directed to an opposite direction to the inserting direction;
an installation portion inner peripheral surface which extends from an outer diameter end of the stepped surface in the opposite direction to the inserting direction; and
the stepped surface and the installation portion inner peripheral surface being formed on an inner peripheral surface of said outer peripheral member,
wherein said seal ring is arranged in a compressed state between said taper-like outer peripheral surface and the installation portion outer peripheral surface, and said stepped surface and the installation portion inner peripheral surface;
wherein, in an uninstalled state, the seal ring has a rectangular cross-sectional shape; and
wherein, in an installed state, the seal ring includes:
an end surface outer diameter portion in close contact with the stepped surface;
an inner peripheral surface in close contact with the installation portion outer peripheral surface;
an inner peripheral surface in close contact with the taper-like outer peripheral surface; and
an outer peripheral surface in close contact with the installation portion inner peripheral surface; and
wherein, in the installed state, a first void between the seal ring and the inner peripheral member overlaps a transition between the taper-like outer peripheral surface and the installation portion outer peripheral surface, and a second void between the seal ring and the outer peripheral member overlaps a transition between the stepped surface and the installation portion inner peripheral surface.

2. The sealing structure according to claim 1, wherein a second outer peripheral surface is positioned between the taper-like outer peripheral surface and a second taper-like outer peripheral surface and is formed into a cylindrical surface shape.

3. The sealing structure according to claim 1, wherein a taper surface is formed on the inner peripheral surface of the outer peripheral member, and the taper surface is positioned closer to the opposite direction side to the inserting direction than the installation portion inner peripheral surface and has an inner diameter which is equal to or more than a large diameter end portion of the stepped surface and is larger toward the opposite direction side to the inserting direction.

4. The sealing structure according to claim 1, wherein the stepped surface formed on the inner peripheral surface of the outer peripheral member is formed into a taper shape which is smaller in its diameter toward the inserting direction.

5. The sealing structure according to claim 2, wherein a taper surface is formed on the inner peripheral surface of the outer peripheral member, and the taper surface is positioned closer to the opposite direction side to the inserting direction than the installation portion inner peripheral surface and has an inner diameter which is equal to or more than the large diameter end portion of the stepped surface and is larger toward the opposite direction side to the inserting direction.

6. The sealing structure according to claim 2, wherein the stepped surface formed on the inner peripheral surface of the outer peripheral member is formed into a taper shape which is smaller in its diameter toward the inserting direction.

7. The sealing structure according to claim 3, wherein the stepped surface formed on the inner peripheral surface of the outer peripheral member is formed into a taper shape which is smaller in its diameter toward the inserting direction.

8. The sealing structure according to claim 5, wherein the stepped surface formed on the inner peripheral surface of the outer peripheral member is formed into a taper shape which is smaller in its diameter toward the inserting direction.

9. A sealing structure comprising:
an outer peripheral member;
an inner peripheral member which is installed to the outer peripheral member in an inserting state;
a seal ring which stands between the outer peripheral member and the inner peripheral member;
a taper-like outer peripheral surface which is smaller in its diameter toward an inserting direction of the inner peripheral member;
an installation portion outer peripheral surface which extends from the small diameter end portion toward said inserting direction;

the taper-like outer peripheral surface and the installation portion outer peripheral surface being formed on an outer peripheral surface of said inner peripheral member;

a stepped surface which is positioned closer to said inserting direction side than said taper-like outer peripheral surface and is directed to an opposite direction to the inserting direction;

an installation portion inner peripheral surface which extends from an outer diameter end of the stepped surface in the opposite direction to the inserting direction; and the stepped surface and the installation portion inner peripheral surface being formed on an inner peripheral surface of said outer peripheral member, wherein said seal ring is arranged in a compressed state between said taper-like outer peripheral surface and the installation portion outer peripheral surface, and said stepped surface and the installation portion inner peripheral surface;

wherein a second taper-like outer peripheral surface is formed on the outer peripheral surface of the inner peripheral member, and the second taper-like outer peripheral surface is positioned closer to the opposite direction side to the inserting direction than the taper-like outer peripheral surface and has an outer diameter which is equal to or more than a large diameter end portion of said taper-like outer peripheral surface and is larger toward the opposite direction to the inserting direction;

wherein a cylindrical surface is formed on the outer peripheral surface of the inner peripheral member between the taper-like outer peripheral surface and the second taper-like outer peripheral surface;

wherein, in an uninstalled state, the seal ring has a rectangular cross-sectional shape; and wherein, in an installed state, the seal ring includes:
  an end surface outer diameter portion in close contact with the stepped surface;
  an inner peripheral surface in close contact with the installation portion outer peripheral surface;
  an inner peripheral surface in close contact with the taper-like outer peripheral surface;
  an inner peripheral surface in close contact with a second outer peripheral surface formed on the outer peripheral surface of the inner peripheral member;
  an end surface inner diameter portion in close contact with the second taper-like outer peripheral surface; and
  an outer peripheral surface in close contact with the installation portion inner peripheral surface and the second taper-like inner peripheral surface.

* * * * *